Aug. 20, 1957    S. J. KASHIRSKY    2,803,733
HEATED REARVIEW MIRROR FOR VEHICLES
Filed Feb. 7, 1955    2 Sheets-Sheet 1
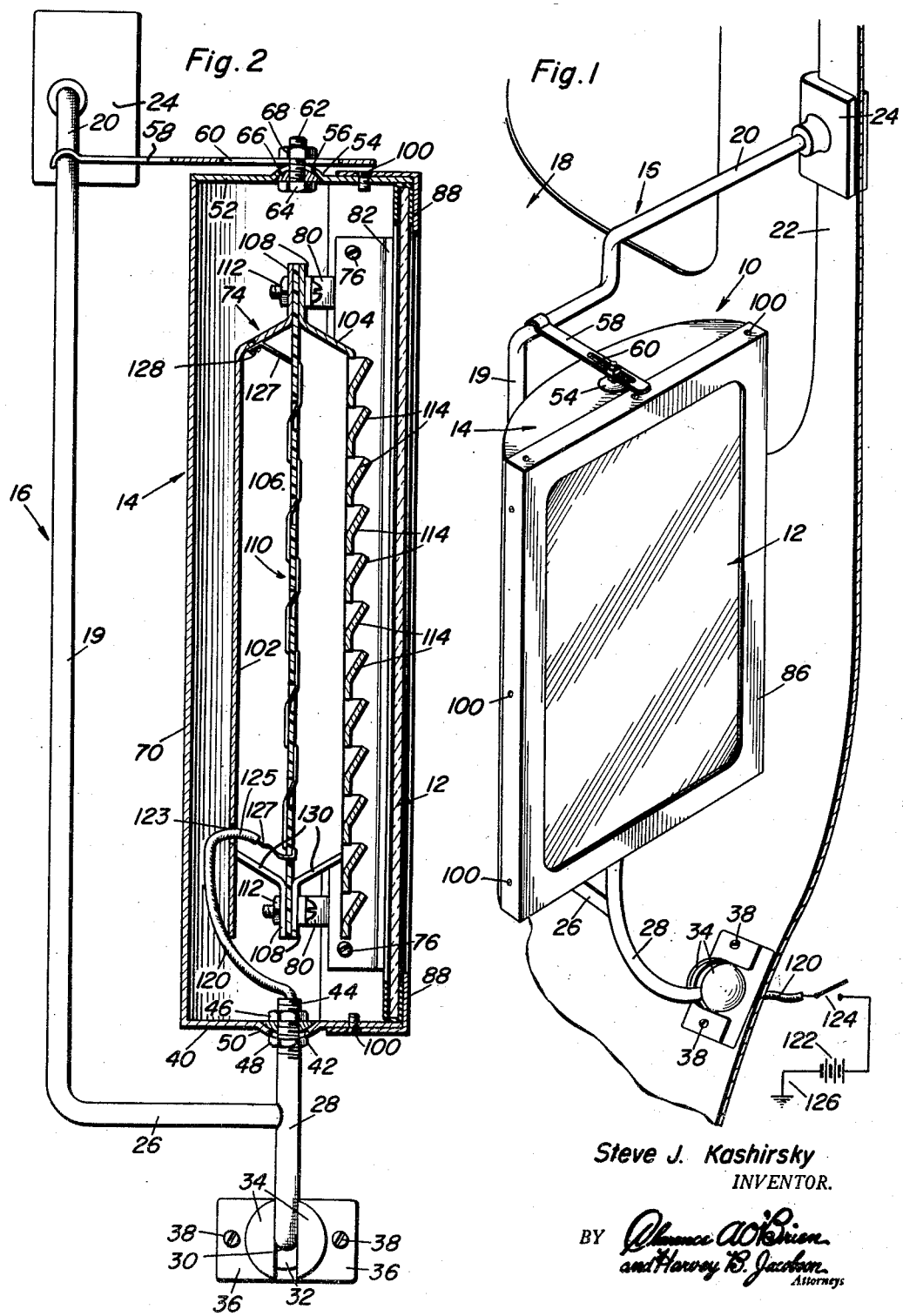
Steve J. Kashirsky
INVENTOR.

Aug. 20, 1957 S. J. KASHIRSKY 2,803,733
HEATED REARVIEW MIRROR FOR VEHICLES
Filed Feb. 7, 1955 2 Sheets-Sheet 2

Steve J. Kashirsky
INVENTOR.

United States Patent Office 2,803,733
Patented Aug. 20, 1957

2,803,733

HEATED REARVIEW MIRROR FOR VEHICLES

Steve J. Kashirsky, Chicago, Ill.

Application February 7, 1955, Serial No. 486,448

1 Claim. (Cl. 219—19)

This invention relates generally to rear view mirrors adapted to be mounted at the side of an automotive vehicle to enable the driver to view a part of the road to the rear of the vehicle, and is more particularly directed to a device of the type described which is readily adapted for use on any automotive vehicle, which may be readily adjusted and firmly retained in an angular position to afford the maximum degree of rear view visibility, which is economical to manufacture, and relatively simple to assemble, and which utilized therewith a self-enclosed heating element including means for directing heated air uniformly upon the back of a mirror surface for maintaining said mirror effective during inclement weather when vision therewith would normally be impaired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel mirror assembly showing it attached to the vehicle and including diagrammatically a source of electrical energy for heating element contained therein;

Figure 2 is an enlarged longitudinal sectional view of the assembly removed from the vehicle;

Figure 3:
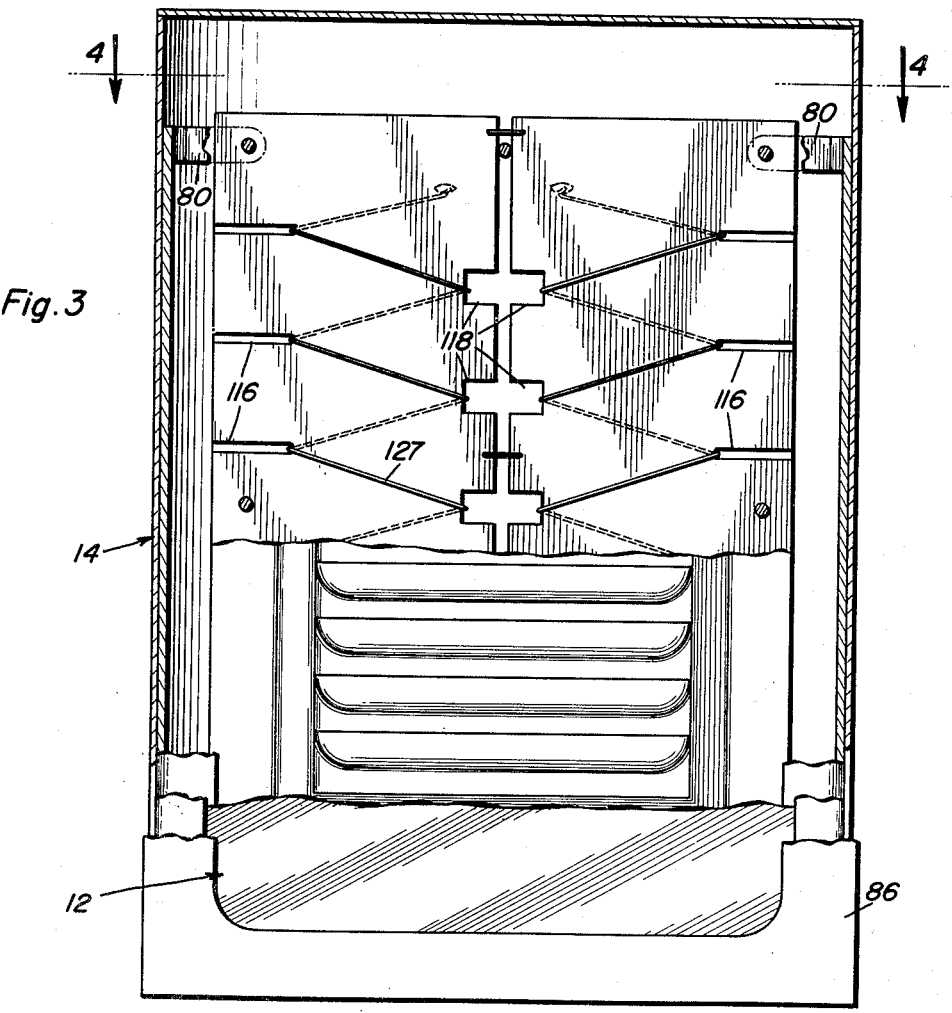
Figure 3 is an elevational view with parts shown in section and broken away for clarity.

The mirror assembly as indicated generally at 10 including a normally rearwardly facing mirrored surface 12, a generally arcuate housing 14 which is pivotally secured by means of a bracket assembly 16 to a suitable portion of a vehicle 18, this portion generally being adjacent the left forward side window of the vehicle in order to be accessible to the driver thereof.

The bracket assembly 16 includes a rear rod portion 19 including an upper angular portion 20 which is connected to the door 22 of the vehicle by means of a conventional two-piece clamp 24. The lower portion of rod 19 includes an angular portion 26 extending away from the rod portion 19 ninety degrees with respect to the portion 20 thereof, and terminating into branch portion 28 comprising a hollow tubular rod member which has at its lower end 30 a spherical ball portion 32 which is secured between the semi-spherical portions 34 of cooperating bracket portions 36 which are secured to the vehicle door by means of suitable fasteners, such as metal screws 38. The housing 14 includes a lower end portion 40 having an aperture 42 therein through which the tubular rod 28 is inserted, said tubular rod 28 including a threaded portion 44 upon which upper and lower lock nuts 46 and 48, respectively, are threaded on opposite sides of said end 40 for securing the rod 28 integral therewith. It will be noted that the upper nut 46 has a convex surface which cooperates with a concave surface of the lower nut 48, each of said nuts clamping therebetween the concavo-convex portion 50 of the end wall 40 which surrounds the aperture 42. This configuration provides a rigid securing means for the tubular rod 28 relative to the housing 14.

The opposite end wall 52 of the housing 14 includes an outwardly disposed concavo-convex portion 54 having an aperture 56 therethrough. Secured to the portion 20 of the bracket assembly in any suitable manner, for example by welding, is an elongated plate element 58 which includes in an intermediate portion thereof an elongated slot 60, through which extends the securing bolt 62 for adjustably securing the housing 14 to said bracket element 58. The bolt 62 includes a head portion 64 and has disposed thereon a convex washer 66 cooperating with the concavo-convex portion 54 of the housing and a nut member 68 retaining said members in a fixed position.

The heretofore mentioned structure thus presents the mirror housing 14 which may be adjusted about the axis of rotation of the tubular element 28 and the bolt 62 when the nuts 48 and 68 are respectively loosened on the threaded portion with which they cooperate. Thus, it is readily apparent that the optimum angle of vision for the driver can be adjusted through this medium. It is further apparent that through the ball 32 enclosed between the semi-spherical portions 34 of the bracket portions 36 and by adjusting the clamp 24 along the door of the vehicle the mirror assembly can be adjusted to a substantially vertical position relative to the ground upon which the vehicle travels. Fine adjustment of the mirror housing in a vertical position to obtain optimum rear view vision is accomplished when the nuts 48 and 62 are loosened as previously mentioned, since the housing may be tilted with respect to the vertical between the nuts 46 and 48, the slot 60 permitting longitudinal movement of the bolt 62 therein.

Figure 4:
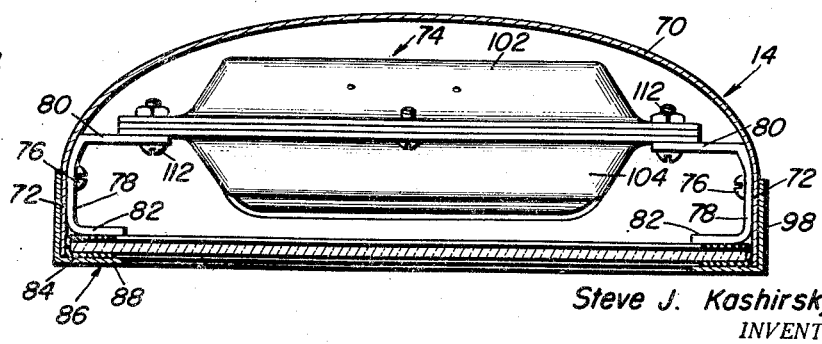
Figure 4 is a horizontal sectional view taken substantially on line 4—4 of Figure 3.

As seen in Figure 4, the housing 14 comprises an arcuate back portion 70 which terminates in relatively parallel sides 72, the sides 72 and ends 40 and 52 with the arcuate back portions 70 defining the housing or shell within which is secured a heating assembly 74. Secured adjacent each of the side portions 72 inside of the housing 14 by means of screw members 76, for example, are longitudinally extending bracket elements 78 which include the bracket ear elements 80 upon which the heating assembly 74 is mounted in a manner to be subsequently described, and including angularly extending flange portions 82 utilized for securing the mirror 12 on the housing 14. The mirror assembly 12 includes a conventional mirrored surface of the type generally used on outdoor rear view mirrors, and has its edge portions taped with a suitable resilient material, such as cork, indicated at 84 for protecting said mirror against vibration, etc., said mirror resting against the flanges 82 of members 78 and extending between the parallel sides 72 of the housing 14. A suitable frame member 86 which includes inwardly directed flange portion 88 which is in juxtaposition over the previously mentioned protective portion 84 of the mirror, the mirror being secured between flange portion 82 and portion 88 of the frame, the frame also including a right angled flange portion 98 which extends on the outside of the side portions 72 of the housing 14, the frame being secured thereto by suitable fasteners such as screws 100.

The heater assembly 74 includes a pair of complementary housing portions 102 and 104 forming the heating space 106, said housing portions including angular flanges 108 which have interposed therebetween a nonconductive plate 110, such as mica, and secured by means of suitable fasteners 112 which extend through the ear support elements 80, the flange portions 108 and the mica non-conductive element 110, as most clearly seen in Figure 2.

The housing portion 104 includes adjacent the rear portion of the mirror assembly 12, a plurality of transverse open louvered portions 114 which open upwardly in order to direct heat from the heating chamber 104 on the rear surface of the mirror assembly 12 for the purposes heretofore described in the objects of invention.

The non-conductive portion 110 of the heating element includes a plurality of peripheral slots 116 and centrally disposed notch portions 118.

An electrical conductor 120 is connected to a source of potential 122 with a switch 124 interposed therebetween, the source of potential 122 being grounded as indicated at 126. The conductor 120 extends through an aperture (not shown) in the ball 32 and thence through the tubular element 28 and into the housing 114. The conductor 120 as seen in Figure 2, extends through a suitable aperture 123 in the housing portion 104, the heretofore mentioned portion of the conduit 122 including the insulating portion 125 thereof. The remaining portion of the conduit 122 consists of the uncovered wire portion 127 which constitutes a conventional resistance type heating element which is interlaced between the slots 116 and notches 118 in the manner clearly illustrated in Figure 3, the wire 127 being secured to the rear housing portion 102 of the heating element by means of a suitable fastening member, such as screw element 128.

Thus, it is believed readily apparent that when the switch 124 is closed current will flow through the conduit 120 to the wire portions 127 causing said wires to be heated up in a manner well known, wherein the air contained in chamber 106 will pass the louvers 114 onto the rear portion of the mirror assembly 112 thus eliminating accumulation of ice, snow, fog, etc., on the visible portion of the mirror assembly 12.

As indicated at 130, the lower portions of the housing portions 102 and 104 include open slots to insure circulation of air within the heating assembly and mirror assembly, thus air warmed within the heating unit 74 results in upward movement of the heated air out of the louvered portions 114, such movement promoting the circulation of heated air within the mirror assembly with a minimum of heat loss involved.

The terms "front," "rear," "top," "bottom," etc. or any other positional directional terms contained herein are intended to have only a relative connotation to aid in describing the device and are not intended to be interpreted as requiring any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

A rear view mirror assembly including an elongated housing member having an open side, longitudinally extending bracket elements secured on opposite inner side wall portions of said housing member adjacent said open side, a mirror including resiliently bound edge portions in contact with said longitudinally extending side brackets, a frame encircling said open sides of the housing for securing said mirror between said frame and said bracket elements, and a heating element in said housing comprising a pair of opposite rectangular housing sections having edges secured together, said housing sections forming a rectangular heating chamber therebetween, and one of said housing sections being secured to said bracket elements and provided with transverse louvers facing the mirror, a plate of non-conductive material clamped between the edges of said housing sections and dividing the heating chamber, and a resistance element laced through said plate.

References Cited in the file of this patent
UNITED STATES PATENTS

| | | |
|---|---|---|
| 1,622,068 | Thompson | Mar. 22, 1927 |
| 1,822,774 | Gallagher | Sept. 8, 1931 |
| 2,514,647 | Jolliffe | July 11, 1950 |
| 2,565,256 | Myers et al. | Aug. 21, 1951 |
| 2,585,273 | Prutzman | Feb. 12, 1952 |
| 2,693,589 | Hopkins | Nov. 2, 1954 |
| 2,701,294 | Hebert | Feb. 1, 1955 |
| 2,708,086 | Prutzman | May 10, 1955 |
| 2,722,160 | Prutzman | Nov. 1, 1955 |